United States Patent Office 3,555,095
Patented Jan. 12, 1971

3,555,095
HYDROXY AMINIMINES
Robert C. Slagel, Savage, Minn., assignor to Ashland Oil & Refining Company, Ashland, Ky., a corporation of Kentucky
No Drawing. Filed Mar. 19, 1968, Ser. No. 714,323
Int. Cl. C07c *109/02, 109/04*
U.S. Cl. 260—584  7 Claims

ABSTRACT OF THE DISCLOSURE

An anhydrous compound useful as chemical intermediates and surfactants, having at least one moiety of the formula:

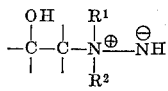

wherein $R^1$ and $R^2$ represents the same or different alkyl, cycloalkyl, or aralkyl radicals or together represent a single divalent organic radical, and processes for their preparation.

---

Trimethylaminimine, the preparation of which is disclosed in Wittig et al., 562 Ann. 181, 183, and Appel et al. 99 Berichte 3118, and its more stable di-t-butanol disclosed in Appel et al. (supra) and Appel U.S. Pat. 3,313,855, are extremely useful reactants for the introduction of the —NH group under mild conditions into a wide variety of compounds, and particularly Lewis bases, Lewis acids, and esters with which they form aminimides and ketones with which they give imines.

Other related compounds having water of hydration have been produced (Benoit 6 Bull Soc. Chim. 708, 1939) by reacting ethylene oxide with 1,1-dimethyl hydrazine in the presence of water. While these hydrated compounds undergo reaction similar to those of trimethylaminimine, the water of hydration is frequently evolved during the reaction. This water of hydration has a deleterious effect on water-sensitive reactants and products. When the product is an aminimide, this water of hydration interferes with pyrolysis which would otherwise yield an isocyanate group.

Accordingly, it is an object of the present invention to provide a novel class of aminimines and particularly hydroxy aminimines substantially free of one or more disadvantages of prior art aminimines. Another object is to produce aminimines free of water of hydration. A further object is to produce a class of aminimines useful as surfactants and/or foaming agents. A still further object is to provide a novel process for the synthesis of aminimines. Additional objects and advantages will be apparent to those skilled in the art from the following detailed description thereof.

According to the present invention there are provided anhydrous aminimines having at least one moiety of Formula I:

(I)

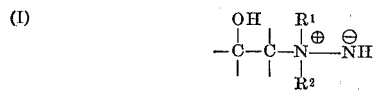

wherein $R^1$ and $R^2$ represent the same or different alkyl, cycloalkyl, or aralkyl radicals or together represent a single divalent organic radical.

A preferred class of compounds having the moiety of Formula I are compounds of Formula II:

(II)

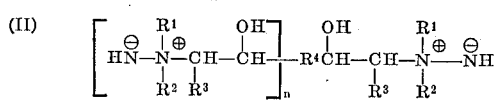

wherein $R^1$ and $R^2$ have the above-described meanings, $R^3$ is hydrogen or an organic radical, $R^4$ is hydrogen or an organic radical of valence $n+1$, and $n$ is an integer from 0 to 4 inclusive. Examples of suitable organic radicals, $R^3$ or $R^4$, include aliphatic and aromatic radicals such as alkyl, preferably lower alkyl such as methyl, ethyl, and isobutyl; aryl such as phenyl or naphthyl; aralkyl such as benzyl or 5-naphthyl pentadecyl; and alkaryl such as p-ethyl phenyl.

A preferred class of the compounds of Formula II are compounds of Formula III:

(III)

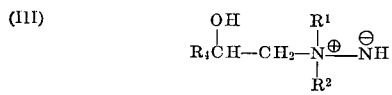

wherein $R^1$ and $R^2$ are lower alkyl and $R^4$ is hydrogen, alkyl, aryl, aralkyl, or alkaryl, but is preferably hydrogen or lower alkyl. In that embodiment wherein $R^4$ is a fatty radical of 8 to 30 carbon atoms, the compounds of Formula III exhibit surfactant properties and can be used as foaming agents. Examples of suitable fatty radicals include, among others, stearyl, lauryl, oleyl, and linoleyl.

Compounds having the moiety of Formula I can be prepared by reacting an epoxide with an unsymmetrical disubstituted hydrazine.

Suitable unsymmetrical disubstituted hydrazines are those of Formula IV:

(IV)

wherein $R^1$ and $R^2$ can be alkyl, cycloalkyl, or aralkyl radicals of 1 to 30 carbon atoms. Examples of suitable alkyl radicals include, among others, heptacosyl, cyclohexyl, t-butyl, isopropyl, ethyl, and methyl. Lower alkyl radicals are preferred. Examples of suitable aralkyl radicals include among others, benzyl, 2-phenyl-propyl and 3-naphthyl-butyl. When $R^1$ and $R^2$ together represent a single divalent organic radical, this radical can be a ring of 3 to 10, preferably 4 to 6, carbon atoms with the optional inclusion of one or two hetero atoms such as oxygen, sulfur, and nitrogen. $R^1$ and $R^2$ can be substituted with one or more, preferably one to three, substituents which are substantially inert to the reactants employed in the process of the present invention. Examples of suitable substituents include, among other, hydroxyl, mercapto, and lower alkoxy such as methoxy.

Examples of suitable unsymmetrical disubstituted hydrazines include, among others, 1 - allyl - 1 - benzylhydrazine, 1- cyclohexyl - 1 - ethylhydrazine, 1 - aminopyrrolidine, 4 - aminomorpholine, amino hexamethylene imine, 1 - aminopiperidine, 1 - amino - 4 - phenylpiperazine, 1 - amino - 4 - benzoylpiperazine, 1 - aminoperhydroindole, 1 - methyl - 1 - pentacosyl hydrazine, 1 - ethyl - 1 - methyl hydrazine, and 1,1 - dimethyl hydrazine which is most preferred because of reactivity, cost and availability. Compounds such as 1,4 - diamino piperazine having in effect two unsymmetrical hydrazine groups are also within the broad scope of the present invention, although they are preferably reacted with compounds having only one reactive epoxide group, in order to inhibit polymerization.

The particular epoxide employed in the present invention is not critical, although some are preferred, and a wide variety of compounds having at least one reactive epoxide group can be employed. By "reactive epoxide group" is meant a moiety of Formula V:

(V)

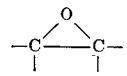

which is coreactive with the unsymmetrical disubstituted hydrazines of Formula IV. The epoxide group of Formula V can be internal, wherein each carbon atom of the oxirane ring is attached to at least one organic radical or, more preferably, are terminal, wherein at least one carbon atom is attached to two hydrogen atoms. These epoxides can be monoepoxides containing one reactive epoxide group, or polyepoxides containing a plurality of reactive epoxide groups, as well as other groups which do not, preferentially, react with the reactants employed in the present invention.

Examples of suitable monoepoxides include cyclohexene oxide as well as those of Formula VI:

(VI) 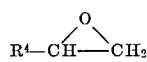

wherein $R^4$ is hydrogen, alkyl, aryl, aralkyl, or alkaryl such as ethylene oxide, propylene oxide, styrene oxide, gylcidol, α-decyl oxide, α-pentadecyl oxide, and α-noncosyl oxide.

Examples of suitable polyepoxides include those of Formulae VII through XIV, below:

(VII) 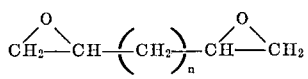

wherein $n$ is an integer from 0 to 12 inclusive;

(VIII) 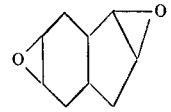

(IX) 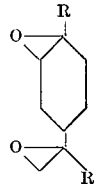

wherein R is H or $CH_3$;

(X) 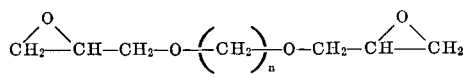

wherein $n$ is an integer from 1 to 4 inclusive;

(XI) 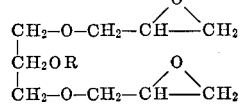

wherein R is H or

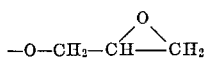

(XII) 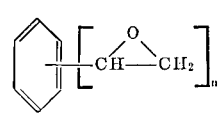

wherein $n$ is 2 or 3;

(XIII) 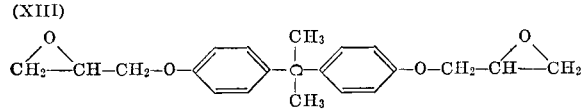

and the polymers thereof sold under the trade name "Epon." In general, these polymers are the reaction product of bisphenol-A and an epihalohydrin, preferably epichlorohydrin; and compounds such as (XIV) 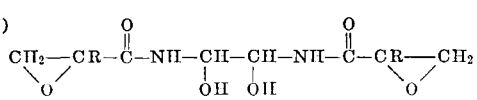

wherein R is H or lower alkyl and other similar compounds disclosed in British Pat. 1,060,848.

The compounds of the present invention are produced by mixing stoichiometric amounts of the epoxide and the hydrazine, i.e. one mole of a monoepoxide or one-half mole of diepoxide per mole of hydrazine. Solvents are not necessary, but can be employed in amounts up to infinite dilution. Solvents such as benzene ethyl ether and dimethyl sulfoxide can be employed, but the preferred solvents are the lower alkanols, examples of which include, among others, methanol, ethanol, isopropanol, and t-butanol which is preferred. The reaction temperature is not critical and any temperature above that at which one or more reactants solidifies and below that at which some degradation takes place, is suitable, and generally between 0° C. and 150° C., preferably between 20° C. and 80° C. The reaction times vary widely from about five minutes to about five days, but preferably one hour to three days, depending upon the temperature, the lower temperatures requiring longer reaction times. While it is not desired to limit the present invention to any particular theory, the reaction apparently proceeds according to Equations 1 and 2.

(Eq. 1) 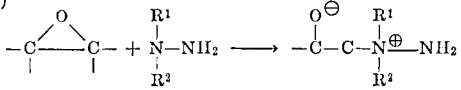

(Eq. 2) 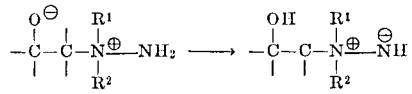

The compounds of the present invention find utility as chemical intermediates for a wide variety of compounds and, in general, can be substituted for trimethylaminimine and its t-butanol adduct in reactions previously employing these materials. Certain compounds of the present invention find utility as surfactants and/or foaming agents.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the synthesis of a compound of Formula XV:

(XV) 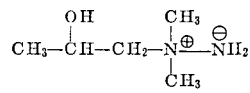

In 120 ml. of dry t-butanol solvent were placed 12.0 g. (0.2 mole) unsymmetrical dimethyl hydrazine and 11.6 g. (0.2 mole) propylene oxide. The mixture was allowed to stir in a sealed pressure bottle at room temperature for 48 hours to give a pale yellow solution. A nuclear magnetic resonance spectrum (t-butanol, τ) of the solution showed a strong singlet at 7.55 p.p.m. ($CH_3$), other peaks at 7.72, 7.68, 6.74, 6.64, 6.52 and a broad peak (OH) at 5.5 p.p.m. The terminal $CH_3$ was hidden under the strong solvent peak.

A small amount of the pale yellow solution was removed to which was added an excess of methyl benzoate. After 18 hours at room temperature, the solvent was removed to give dimethylisopropanol amine benzimide, identical with an authentic sample from a separate source.

A second portion of the pale yellow liquid was cooled in an ice bath and gassed with hydrogen chloride. An exotherm resulted and a solid precipitated. The solid (recrystallized from t-butanol-ether) was shown to be a quaternary ammonium compound by its infrared spectrum which possessed absorption at 3400, 3240, 3140, 3030, 2950 (broad), 2860, 2650 (very broad), 2520, 2480 cm.$^{-1}$ and other absorption at lower frequencies, and by a positive chloride ion test with silver nitrate in an aqueous solution of the quaternary ammonium compound.

The synthesis of the iminimine was repated in isopropanol. Evaporation of the solvent in vacuo gave a pale yellow, viscous, very hygroscopic oil which analyzed as follows: Calculated for $C_5H_{14}N_2O$ (118.18) percent: C, 50.81; H, 11.94. Found (percent): C, 51.32; H, 11.95.

EXAMPLE 2

This example illustrates the synthesis of a compound of Formula XVI:

(XVI)
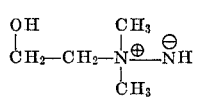

The procedure of Example 1 is followed, employing the same reactants, times and conditions, the single exception being that the propylene oxide is replaced by an equimolar amount of ethylene oxide and the reaction takes place in a closed vessel under autogenous pressure. Similar results are obtained.

EXAMPLE 3

The procedures of Examples 1 and 2 are repeated, employing the same times, reactants and conditions, with the single exception that the 1,1-dimethyl hydrazine is replaced respectively by an equimolar amount of 1-methyl-1-ethyl hydrazine and then 4-aminomorpholine. Similar results are obtained.

Although the invention has been described in considerable detail with reference to certain preferred embodiments thereof, it will be understood that variations and modifications can be effected within the spirit and scope of the invention as described above and as defined in the appended claims.

What is claimed is:
1. A compound of the formula:

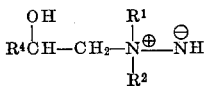

wherein $R^1$ and $R^2$ are lower alkyl and $R^4$ is hydrogen or a $C_1$–$C_{30}$ alkyl group.

2. A compound of claim 1 wherein $R^4$ is hydrogen or lower alkyl.

3. A compound of claim 1 of the formula:

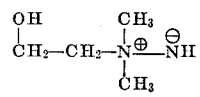

4. A compound of claim 1 of the formula:

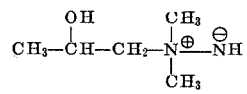

5. A compound of claim 1 wherein $R^4$ is a fatty radical of 8 to 30 carbon atoms.

6. A process for producing the compounds of claim 1, comprising reacting in an anhydrous lower alkanol solvent and at a temperature of 0° C. to 150° C. an unsymmetrical disubstituted hydrazine of the formula:

wherein $R^1$ and $R^2$ are lower alkyl; with an epoxide of the formula:

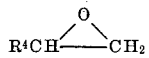

wherein $R^4$ is hydrogen or a $C_1$–$C_{30}$ alkyl group.

7. The process of claim 6 wherein the reaction temperature is 20° C. to 80° C.

References Cited

UNITED STATES PATENTS 2,955,108  10/1960  Omietanski _____ 260—583BX
2,953,570  9/1960   Rudner _____ 260—583BX

OTHER REFERENCES

Benoit, Chemical Abstracts, vol. 33 (1939), p. 5356.

JOSEPH P. BRUST, Primary Examiner

R. L. RAYMOND, Assistant Examiner

U.S. Cl. X.R.

252—152; 260—247.5, 294.7, 326.15, 326.86, 348, 561, 563, 569, 583